(12) United States Patent
Abdelghaffar et al.

(10) Patent No.: US 11,424,884 B2
(45) Date of Patent: Aug. 23, 2022

(54) DEMODULATION REFERENCE SIGNAL HAVING A REDUCED OVERHEAD

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Weimin Duan, San Diego, CA (US); Pavan Kumar Vitthaladevuni, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/033,656

(22) Filed: Sep. 25, 2020

(65) Prior Publication Data

US 2021/0105117 A1 Apr. 8, 2021

(30) Foreign Application Priority Data

Oct. 4, 2019 (GR) .............................. 20190100439

(51) Int. Cl.
*H04W 72/04* (2009.01)
*H04L 5/00* (2006.01)

(52) U.S. Cl.
CPC ....... *H04L 5/0048* (2013.01); *H04W 72/0446* (2013.01); *H04W 72/0453* (2013.01)

(58) Field of Classification Search
CPC ..... H04L 5/0048; H04L 5/0026; H04L 5/001; H04L 25/022; H04L 5/0051;
(Continued)

(56) References Cited

U.S. PATENT DOCUMENTS

| 2014/0226541 A1 | 8/2014 | Xu et al. |
| 2014/0226636 A1* | 8/2014 | Xu ........................ H04L 5/0053 370/336 |

(Continued)

OTHER PUBLICATIONS

International Search Report and Written Opinion—PCT/US2020/053142—ISA/EPO—dated Jan. 13, 2021.
(Continued)

*Primary Examiner* — Jay P Patel
(74) *Attorney, Agent, or Firm* — Arent Fox, LLP; Kevin M. Donnelly

(57) ABSTRACT

An apparatus for wireless communication transmits a demodulation reference signal (DMRS) for at least eight orthogonal DMRS ports in a single symbol of at least one slot. The apparatus also transmits data in the at least one slot. The apparatus may correspond to a base station transmitting DMRS and downlink data. The apparatus may correspond to a user equipment (UE) transmitting DMRS and uplink data. The apparatus may bundle the DMRS across multiple slots with a bundled DMRS including a first set of the DMRS ports in a first single symbol of a first slot and a second set of the DMRS ports in a second single symbol of a second slot. The apparatus may transmit the DMRS in only a single slot in a physical resource block group (PRG) including two or more resource blocks using four frequency domain orthogonal cover codes (FD-OCC) and a frequency offset pattern.

30 Claims, 14 Drawing Sheets

(58) Field of Classification Search
CPC ... H04L 5/0044; H04L 5/0082; H04L 5/0023; H04L 27/2613; H04L 5/0016; H04W 72/0446; H04W 72/0453
See application file for complete search history.

(56) References Cited

U.S. PATENT DOCUMENTS

| | | | |
|---|---|---|---|
| 2017/0288835 A1* | 10/2017 | Kim | H04W 72/042 |
| 2018/0270799 A1 | 9/2018 | Noh et al. | |
| 2020/0136690 A1* | 4/2020 | Noh | H04L 5/0092 |
| 2021/0058906 A1* | 2/2021 | Seo | H04W 16/28 |
| 2021/0227511 A1* | 7/2021 | Solano Arenas | H04L 27/2602 |
| 2021/0227512 A1* | 7/2021 | Solano Arenas | H04L 5/0082 |
| 2021/0297118 A1* | 9/2021 | Kwak | H04B 7/0452 |

OTHER PUBLICATIONS

LG Electronics: "Evaluation Result of NR DMRS", 3GPP TSG RAN WG1 NR Ad-Hoc Meeting, 3GPP Draft; R1-1700481 LG DL DMRS Design, 3rd Generation Partnership Project (3GPP), Mobile Competence Centre; 650, Route Des Lucioles; F-06921 Sophia-Antipolis Cedex; France vol. RAN WG1, No. Spokane, USA; Jan. 16, 2017-Jan. 20, 2017, Jan. 10, 2017 (Jan. 10, 2017), 6 Pages, XP051202903, Retrieved from the Internet: URL: http://www.3gpp.org/ftp/tsg_ran/WG1_RL1/TSGR1_AH/NR_AH_1701/Docs/ [retrieved on Jan. 10, 2017], The Whole Document.

* cited by examiner

DEMODULATION REFERENCE SIGNAL HAVING A REDUCED OVERHEAD

CROSS REFERENCE TO RELATED APPLICATIONS

This application claims priority to Greek Patent Application Number 20190100439 titled "DEMODULATION REFERENCE SIGNAL HAVING A REDUCED OVERHEAD," filed Oct. 4, 2019, which is assigned to the assignee hereof, and incorporated herein by reference in its entirety.

BACKGROUND

Technical Field

The present disclosure relates generally to wireless communication, and more particularly, to the transmission of a demodulation reference signal (DMRS) with reduced overhead.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

Wireless communication may involve the transmission of a demodulation reference signal (DMRS). Additional reception antennas at a receiver, such as a user equipment (UE), may enable data transmission on a greater number of layers. However, the added overhead for DMRS for the additional number of layers may reduce the number of symbols in a slot that are available for data. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Additional receive antennas at a user equipment (UE) may enable the UE to be scheduled with a higher number of downlink layers, and as a result, multiple input multiple output (MIMO) communications between a UE and a base station may be improved. However, an increased number of downlink layers generally leads to increased overhead for demodulation reference signal (DMRS) transmission and reduces the spectral efficiency of the communication. Aspects presented herein provide ways to support added DMRS ports with reduced overhead.

In aspects of the disclosure, a method, a computer-readable medium, and an apparatus are provided. The apparatus transmits a DMRS for at least eight orthogonal DMRS ports in a single symbol of at least one slot and transmits data in the other symbols of the at least one slot. Transmitting the DMRS in the at least one slot may include bundling the DMRS across multiple slots and transmitting the bundled DMRS in the multiple slots. The bundled DMRS may include a first set of the DMRS ports in a first single symbol of a first slot and a second set of the DMRS ports in a second single symbol of a second slot. For example, the DMRS may be bundled across two adjacent slots, each slot including a single symbol DMRS.

In aspects of the disclosure, a method, a computer-readable medium, and an apparatus are provided. The apparatus applies four frequency domain orthogonal cover codes (FD-OCC) and a frequency offset pattern to generate a DMRS for at least eight orthogonal DMRS ports. The apparatus transmits the DMRS in a single symbol in a single slot in each of at least two resource blocks in a physical resource block group (PRG) and transmits data in other symbols of the single slot. A DMRS port corresponding to each of the four FD-OCCs may be transmitted on the same frequency domain resources.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
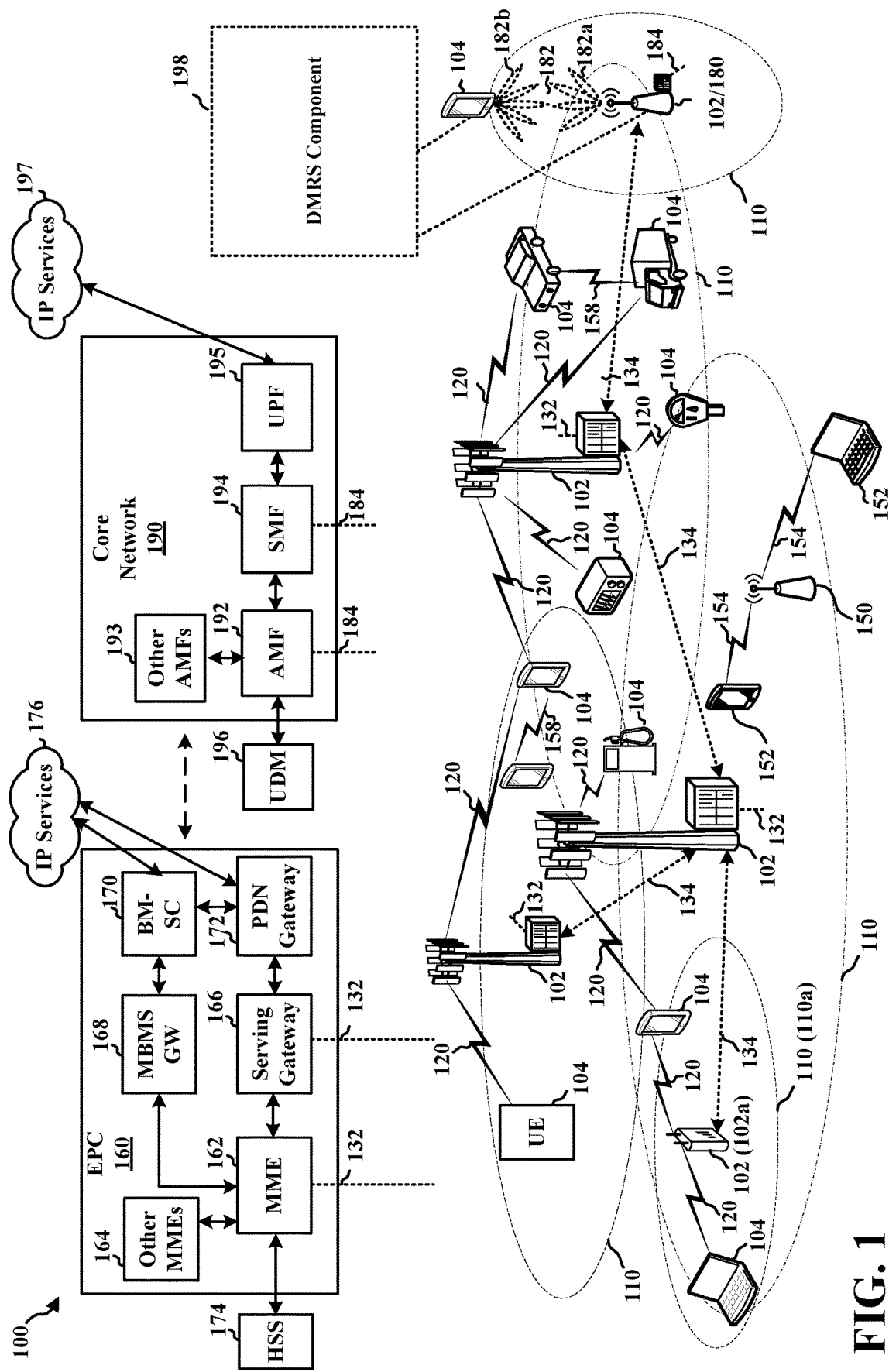
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Additional receive antennas at a user equipment (UE) may enable the UE to be scheduled with a higher number of downlink layers, and as a result, multiple input multiple output (MIMO) communications between a UE and a base station may be improved. However, an increased number of downlink layers generally leads to increased overhead for demodulation reference signal (DMRS) transmission. For wireless channels experiencing medium or high levels of Doppler effects, more than one instance of a DMRS pattern should typically be configured by the network during the slot such that the UE can track the changes of the wireless channel over time within the slot. For example, a base station may transmit a DMRS using eight ports with a DMRS configuration type-1 pattern in two front-loaded DMRS symbols of a slot. The base station may transmit two additional DMRS symbols in the slot to enable a UE to track channel variations due to Doppler effects. However, the use of four symbols in a slot that consists of fourteen symbols represents a significant amount of overhead for DMRS transmission to enable the UE to receive a data transmission from a base station. The reduced number of remaining symbols in the slot that are available for the data transmission results in a reduction in the spectral efficiency of the communication.

Aspects presented herein provide ways to support DMRS transmission using additional DMRS ports with reduced overhead. The DMRS transmission may be limited to a single symbol in a slot. The DMRS may be transmitted over at least 8 DMRS ports to support up to eight layers of data transmissions. In some implementations, a transmitting device may transmit a DMRS in a single symbol within each of two consecutive slots by bundling the DMRS transmission across the two consecutive slots. For example, the DMRS in the bundled slots may use the same frequency domain orthogonal cover code (FD-OCC) and time domain orthogonal cover code (TD-OCC). In particular, the TD-OCC may be applied to a pseudo-random sequence across slots rather than across symbols. In some other implementations, a transmitting device may transmit a DMRS in a single symbol of a single slot using four FD-OCCs and a frequency offset pattern. For example, a transmitting device may generate a DMRS by applying the four FD-OCCs and frequency offset pattern to a pseudo-random sequence. The DMRS may be transmitted across a physical resource block group (PRG) that includes at least two resource blocks (RBs) (for example, four RBs). A larger PRG may provide improved processing gain for decoding according to the FD-OCCs.

Some aspects presented herein enable the use of a greater number of downlink layers while avoiding a reduction in spectral efficiency that would typically result from added DMRS overhead. That is, by transmitting the DMRS in a single symbol of a slot, the other symbols in the slot may be available for a data transmission, which may improve the spectral efficiency of the data transmission. By bundling the DMRS over multiple slots or transmitting the DMRS over a larger PRG, the decoding performance of the DMRS may not be hindered. The aspects presented herein enable at least eight orthogonal DMRS ports, and some implementations may enable up to twelve orthogonal DMRS ports using a single symbol within a slot.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF)

band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, a transmitting device may include a DMRS component 198 configured to transmit a DMRS for up to twelve orthogonal DMRS ports in a single symbol of at least one slot. As used herein, a transmitting device may refer to either the UE 104 or the base station 102, 180. For example, the UE 104 may transmit in an uplink direction and the base station 102, 180 may transmit in a downlink direction. In some implementations, the DMRS component 198 may bundle the DMRS across multiple slots, as described in connection with FIGS. 8 and 9. As another example, the DMRS component may transmit the DMRS in only a single slot in a PRG including two or more resource blocks, as described in connection with FIGS. 10 and 11. Although the following description may be focused on 5G NR, the concepts described herein may be applicable to other similar areas, such as LTE, LTE-A, CDMA, GSM, and other wireless technologies.

Figure 2:
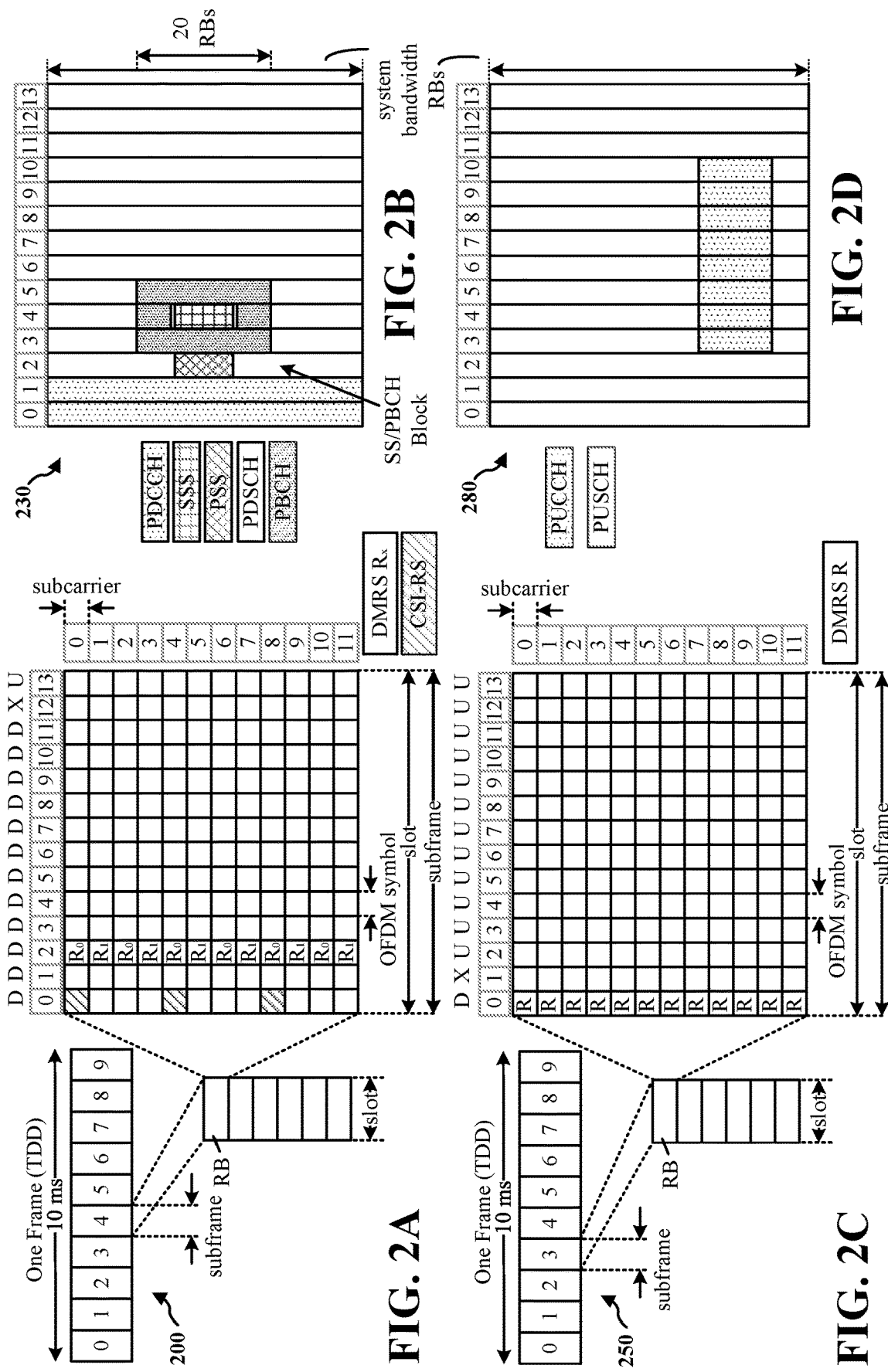
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
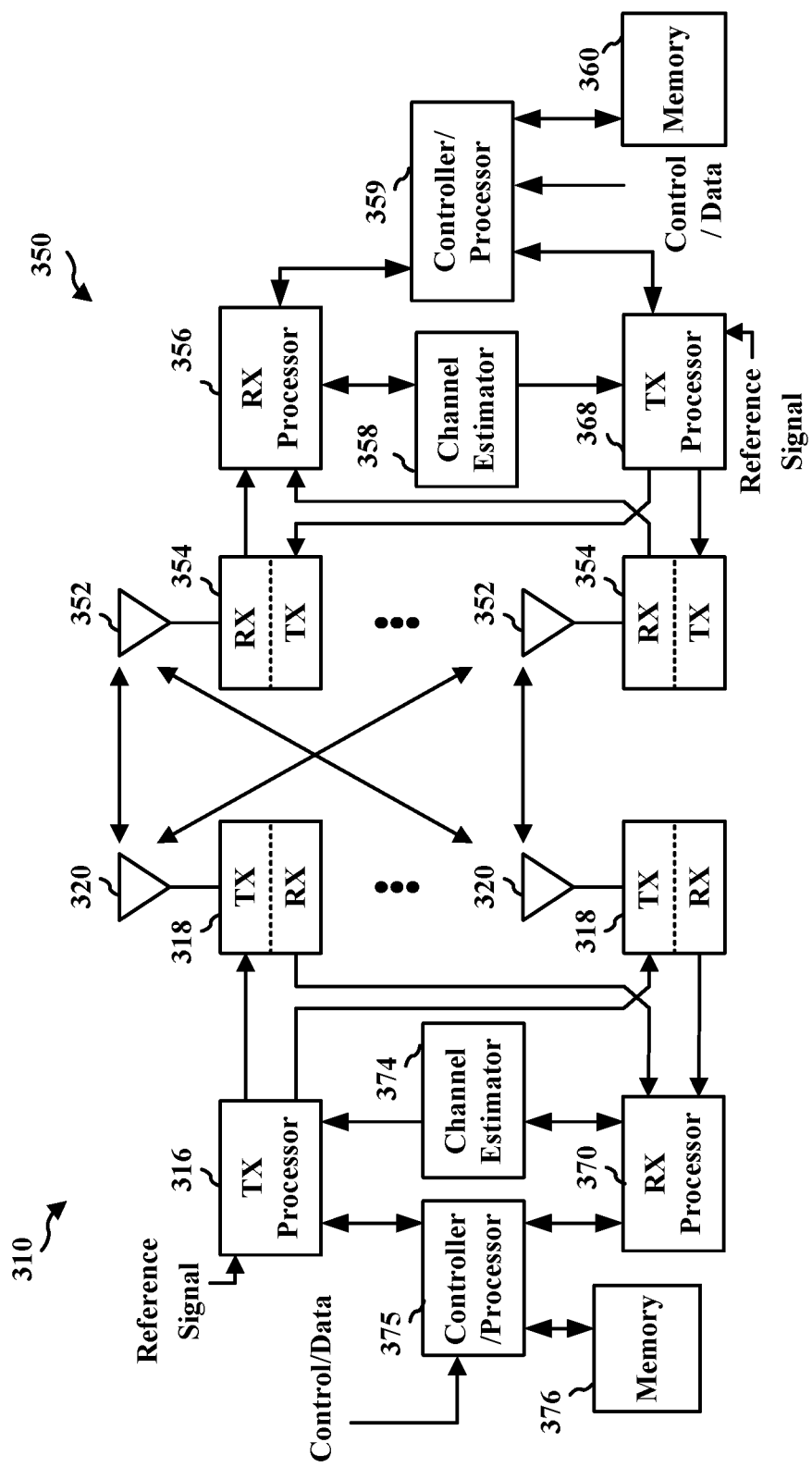
FIG. 3 is a diagram illustrating an example of a base station and user equipment (UE) in an access network.

FIG. 3 is a diagram illustrating an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with DMRS component 198 of FIG. 1. At least one of the TX processor 316, the RX processor 370, and the controller/processor 375 may be configured to perform aspects in connection with DMRS component 198 of FIG. 1.

Additional receive antennas at a user equipment (UE) may enable the UE to be scheduled with a higher number of downlink layers, and as a result, multiple input multiple output (MIMO) communications between a UE and a base station may be improved. A UE with four receive antennas may be limited to a maximum rank of four. A UE with an increased number of receive antennas, such as six or eight receive antennas, may be able to receive additional downlink layers from the base station. The UE uses DMRS for each of the downlink layers to estimate a channel in order to receive data from the base station. Therefore, an increased number of downlink layers generally leads to increased overhead for DMRS transmission to the UE. For example, a UE experiencing a medium level of Doppler effects may use four symbols of DMRS per slot to properly decode data from a base station. Two symbols of the DMRS may be front loaded and two additional symbols of the DMRS may be included in the slot to enable the UE to track channel variation due to the Doppler effects. However, the use of four symbols for DMRS in a slot that consists of fourteen symbols represents a significant amount of overhead for the DMRS transmission to enable the UE to receive data. The reduced number of symbols that remain in the slot for data transmission result in a reduction in the spectral efficiency of the communication.

As described above, a DMRS may be front loaded in a slot, such as coming before data in the slot. The UE may use the DMRS in the slot to estimate a channel before performing reception of the data. A configuration type-1 DMRS using a single symbol may support up to four DMRS ports by applying two frequency domain orthogonal cover codes (FD-OCC) and using a two comb frequency offset pattern in which resource elements associated with different DMRS ports alternate along the tones of a resource block (RB) and in which different codes are applied to different groups of DMRS ports.

Figure 4:
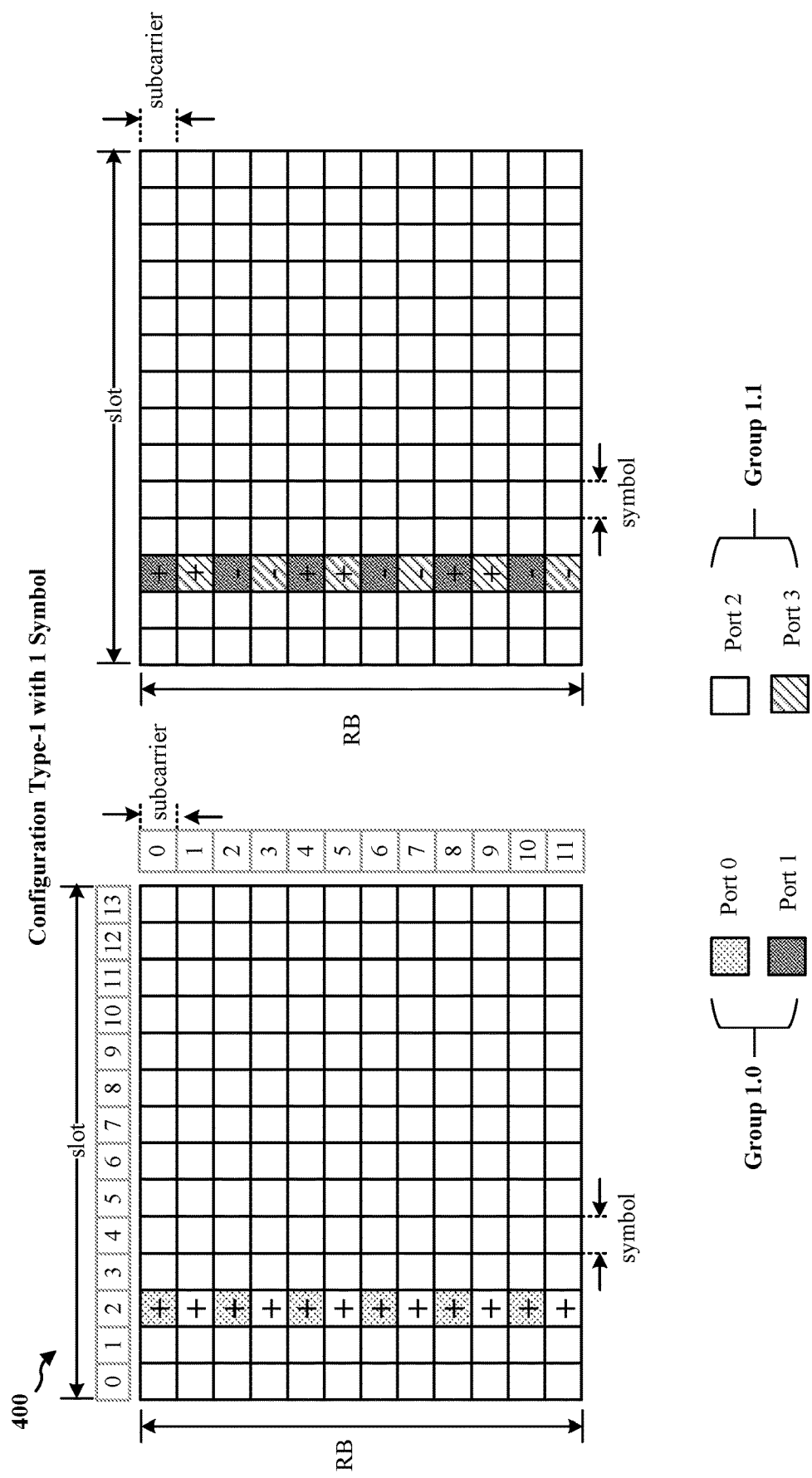
FIG. 4 is a diagram illustrating an example a demodulation reference signal (DMRS) configuration type-1 for one symbol.

FIG. 4 illustrates an example DMRS configuration type-1 400 for one symbol. As illustrated, an RB includes twelve tones, and a slot includes fourteen symbols. Each unique combination of one of the twelve tones and one of the fourteen symbols defines a resource element (RE). The first two symbols of a slot may be used for control transmissions, and the first DMRS symbol may follow the symbols reserved for control, for example, the first DMRS symbol may be in symbol 2 of the slot. Data may then be transmitted in the remaining symbols of the slot. Therefore, the DMRS may be considered front loaded because it is transmitted prior to the data in the slot. A single symbol of configuration type-1, as illustrated in FIG. 4, supports up to four DMRS ports, and as such, supports four downlink layers. For example, the four DMRS ports may be generated by applying different orthogonal cover codes and frequency offsets to a pseudo-random sequence, which may be referred to as a DMRS sequence.

The pattern of alternating resource elements for different DMRS ports in FIG. 4 may be referred to as a "two comb" frequency offset pattern. For example, in FIG. 4, symbol 2 includes a portion of a DMRS that alternates between DMRS Port 0 and DMRS Port 2 along the tones (and thus resource elements) of symbol 2. The same time and frequency resources in symbol 2 of the same slot for the same RB, may be used to transmit a second portion of the DMRS that similarly alternates between DMRS Port 1 and DMRS Port 3, as also shown in FIG. 4.

In FIG. 4, the ports are grouped into two groups. Group 1.0 includes Port 0 and Port 1, and group 1.1 includes Port 2 and Port 3. The DMRS ports from group 1.0 are both transmitted on the same resource elements, for example tones 0, 2, 4, 6, 8, and 10 of symbol 2. The DMRS for the ports from group 1.1 (Port 0 and Port 1) are both transmitted on the same resource elements, such as tones 1, 3, 5, 7, 9, and 11 of symbol 2. To enable the simultaneous transmission of the DMRS from all of the ports in group 1.0 and group 1.1 using the same time and frequency resources, two different orthogonal cover codes may be applied to the ports in the respective groups so that a UE receiving the DMRS may distinguish the DMRS from Port 0 from that from Port 1, and similarly distinguish the DMRS from Port 2 from that from Port 3. In FIG. 4, the first code applied to the resource elements from Port 0 of group 1.0 and from Port 2 of group 1.1 is "+1 +1" code in the frequency domain, meaning that a "+1" code is applied to each of the resource elements from Ports 0 and 2. The second code that is applied to the resource elements from Port 1 of group 1.0 and Port 3 of group 1.1 is "+1 −1" code in the frequency domain, meaning that "+1" and "4" codes are alternately applied to the resource elements from Port 1 and similarly to the resource elements from Port 3 as shown in FIG. 4. Therefore, even though the DMRS for the ports in the respective groups are transmitted in the same time and frequency resource, a receiving device can distinguish the different DMRS ports of each group based on the different frequency domain orthogonal cover codes (FD-OCCs) applied to the resource elements of the DMRS.

Figure 5:
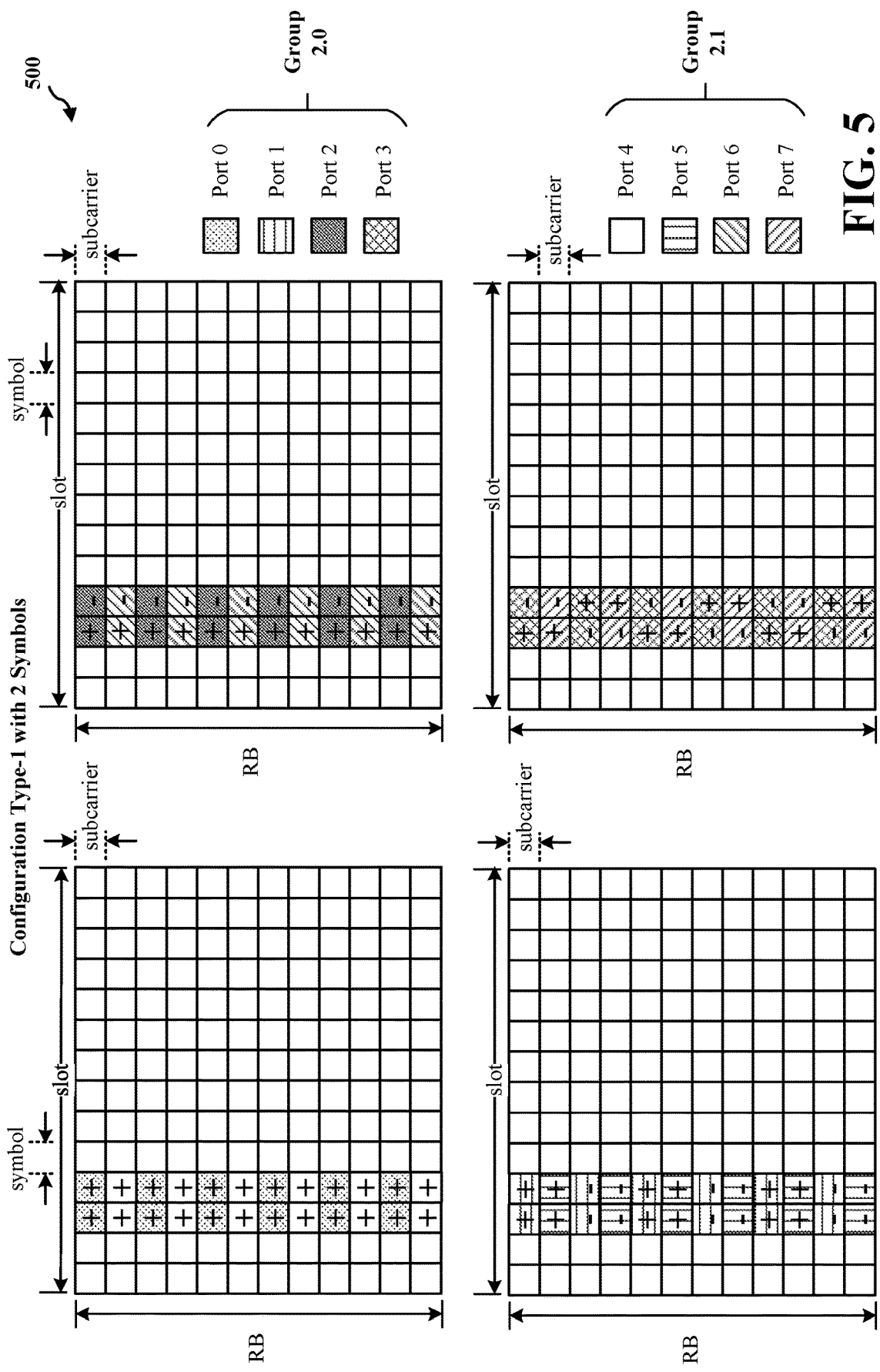
FIG. 5 is a diagram illustrating an example of a DMRS configuration type-1 for two symbols.

If the base station wants to assign more than four layers to a UE, the base station may use more than one symbol to transmit the DMRS. FIG. 5 illustrates an example DMRS configuration type-1 500 for two symbols. Data may then be transmitted in the remaining symbols of the slot, such as in symbols 4 to 13 of the slot. The addition of the second symbol enables two time-domain orthogonal cover codes (TD-OCC) to be applied to the DMRS. Therefore, the two symbols of configuration type-2, as illustrated in FIG. 5, support up to eight DMRS ports. A first group (group 2.0) of the DMRS ports includes Port 0, Port 1, Port 2, and Port 3, and a second group (Group 2.1) includes Port 4, Port 5, Port 6, and Port 7. A two comb pattern of portions of the DMRS for Port 0 from the first group and Port 4 from the second group uses a code of "+1 +1" in the first symbol (symbol 2) and in the second symbol (symbol 3). A two comb pattern of port 1 from the first group and Port 5 from the second group uses a code of "+1 −1" in frequency for both symbol 2 and symbol 3. A two comb pattern of Port 2 and Port 6 use a code of "+1 +1" in frequency for symbol 2 and a code of "−1 −1" in frequency for symbol 3. A two comb pattern of Port 3 and Port 7 uses a code of "+1 −1" in symbol 2 and "−1 +1" in symbol 3. Therefore, the portion of the DMRS for each of the four ports from group 1 that are transmitted using the same time and frequency resources have a different code applied for the combination of the two symbols. Therefore, the UE receiving the DMRS may distinguish the DMRS from the different ports. Therefore, the configuration type-1 DMRS over two symbols supports DMRS for up to eight ports. A UE configured for configuration type-1 over two symbols may receive up to eight downlink layers.

Figure 6:
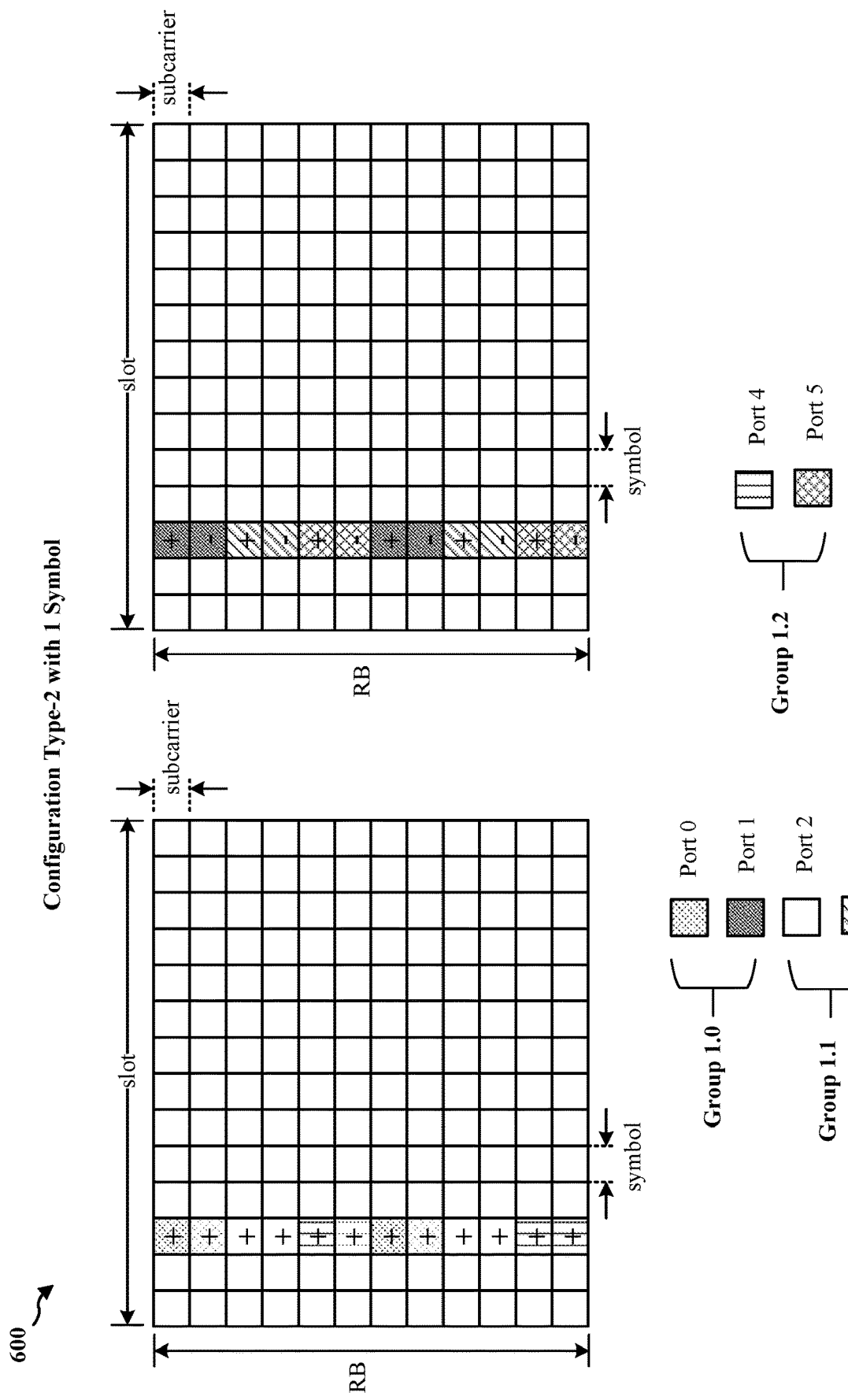
FIG. 6 is a diagram illustrating an example of a DMRS configuration type-2 for one symbol.

FIG. 6 illustrates an example DMRS configuration type-2 600 for one symbol. Rather than a two comb pattern, configuration type-2 uses a three offset frequency offset pattern in which DMRS for a particular port is transmitted in two consecutive resource elements in a symbol that alternates with two consecutive resource elements of two additional DMRS ports. The configuration type-2 pattern enables a pattern of 3 groups (such as Group 1.0, Group 1.1, and Group 1.2) of DMRS ports. The illustrated use of two FD-OCC of "+1 +1" and "+1 −1" enables DMRS for Port 1, Port 3, and Port 5 to be overlapped in time and frequency with the DMRS for Port 0, Port 2, and Port 4. Thus, up to six orthogonal DMRS ports may be supported by configuration type-2 DMRS using one symbol. Data may then be transmitted in the remaining symbols of the slot, such as in symbols 3 to 13 of the slot.

Figure 7:
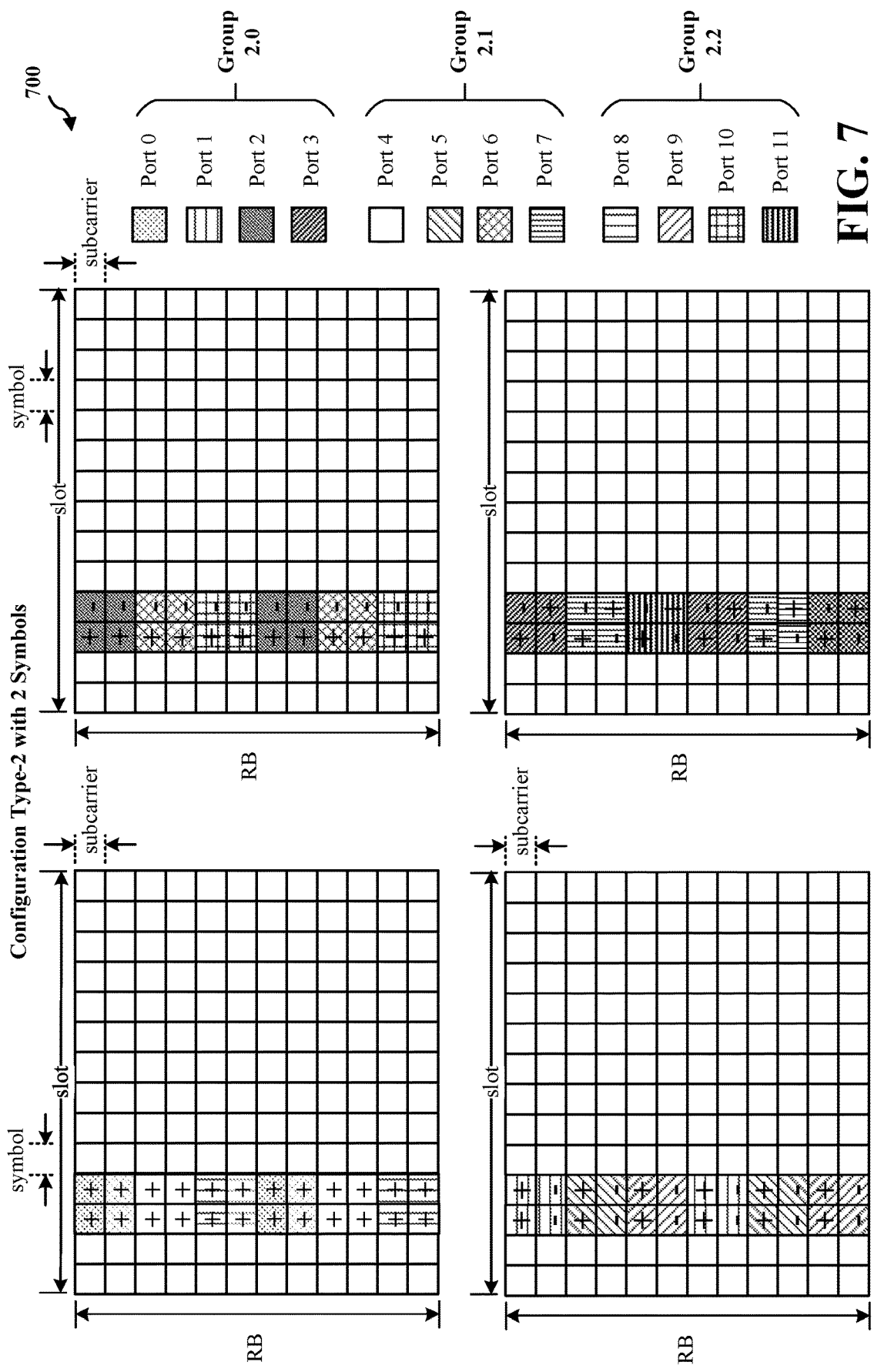
FIG. 7 is a diagram illustrating an example of a DMRS configuration type-1 for two symbols.

FIG. 7 illustrates an example DMRS configuration type-1 700 for two symbols. By adding an additional symbol of DMRS, the configuration type-2 supports up to twelve DMRS ports. As described in connection with FIG. 5, the second OFDM symbol enables the application of TD-OCC for the second symbol to double the number of supported ports for DMRS. Data may then be transmitted in the remaining symbols of the slot, such as in symbols 4 to 13 of the slot.

An increased number of downlink layers generally leads to an increased overhead for DMRS transmission. For a UE experiencing a medium level of Doppler effects, a base station may transmit two front loaded symbols of DMRS and two additional DMRS symbols within a slot to enable the UE to track channel variations due to the Doppler effects. However, the use of four symbols for DMRS transmission for a slot consisting of fourteen symbols represents a significant amount of overhead to enable the UE to properly receive data. The reduced number of symbols of the slot that remain for data transmission results in a reduction of the spectral efficiency of the communication.

Aspects presented herein provide ways to support DMRS transmission using additional DMRS ports with reduced overhead. Some aspects presented herein enable the use of a greater number of downlink layers while avoiding a reduction in spectral efficiency that would typically result from added DMRS overhead. Some implementations may enable up to twelve orthogonal DMRS ports using a single symbol within a slot. In some implementations, a base station may transmit a DMRS in a single symbol of two consecutive slots by bundling the DMRS transmission across the two consecutive slots. In some other implementations, a base station may transmit a DMRS in a single symbol of a single slot using a four FD-OCC and a PRG that includes at least two RBs (for example, four RBs).

Figure 8:
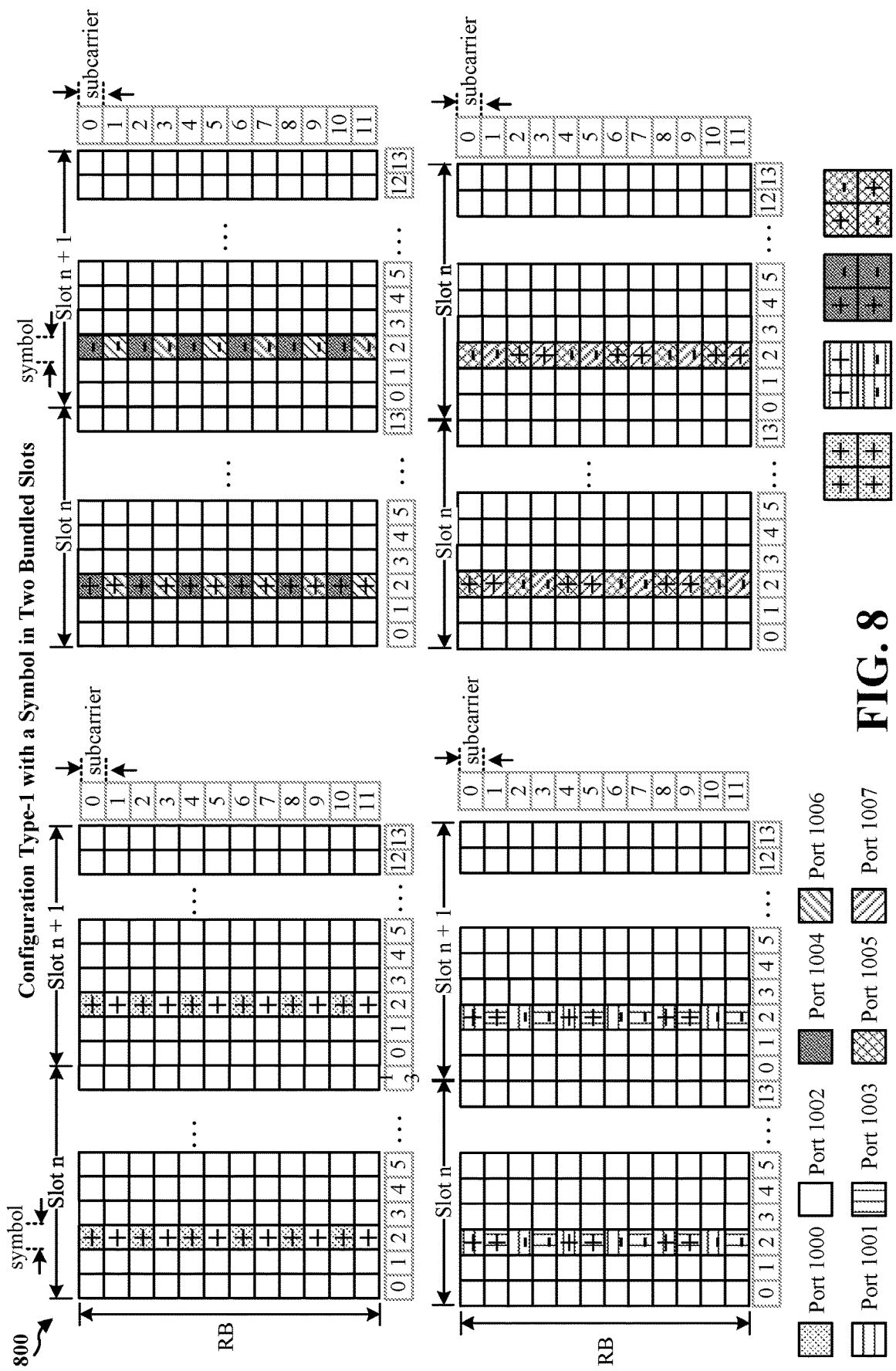
FIG. 8 is a diagram illustrating an example of a DMRS configuration type-1 that includes DMRS bundling across consecutive slots in accordance with some aspects of the present disclosure.

FIG. 8 illustrates an example DMRS configuration type-1 800 that includes DMRS bundling across consecutive slots in accordance with some aspects of the present disclosure. The example DMRS configuration supports up to eight orthogonal DMRS ports using a single symbol per slot. Data may then be transmitted in the remaining symbols of the slot. In FIG. 8, the DMRS in symbol 2 of a first slot (slot n) may be bundled together with the DMRS in symbol 2 of a consecutive slot (slot n+1). DMRS bundling means that the DMRS can be used together by a UE to estimate a channel. The UE will combine the information for the DMRS in the consecutive slots to determine a channel estimation. By bundling the DMRS in the two slots together, the FD-OCC and TD-OCC codes described in connection with FIG. 5 can be applied to the combination of the two symbols for the consecutive slots. FIG. 8 includes a configuration type-1 pattern using a two comb pattern of alternating resource elements for different DMRS ports. A two comb pattern of Port 1000 from and Port 1002 uses a code of "+1 +1" in both the symbol of slot n and in the bundled symbol of slot n+1. A two comb pattern of port 1001 and Port 1003 uses a code of "+1 −1" in frequency for both the symbol in slot n and the symbol in slot n+1. A two comb pattern of Port 1004 and Port 1006 use a code of "+1 +1" in frequency for the symbol in slot n and a code of "−1 −1" in frequency for the symbol in slot n+1. A two comb pattern of Port 1005 and Port 1007 uses a code of "+1 −1" in the symbol of slot n and "−1 +1" in the symbol of slot n+1. The DMRS bundling across slots with the application of TD-OCC may support DMRS for up to eight orthogonal DMRS ports using one symbol per slot and may be good for communication that experiences low Doppler effects.

Figure 9:
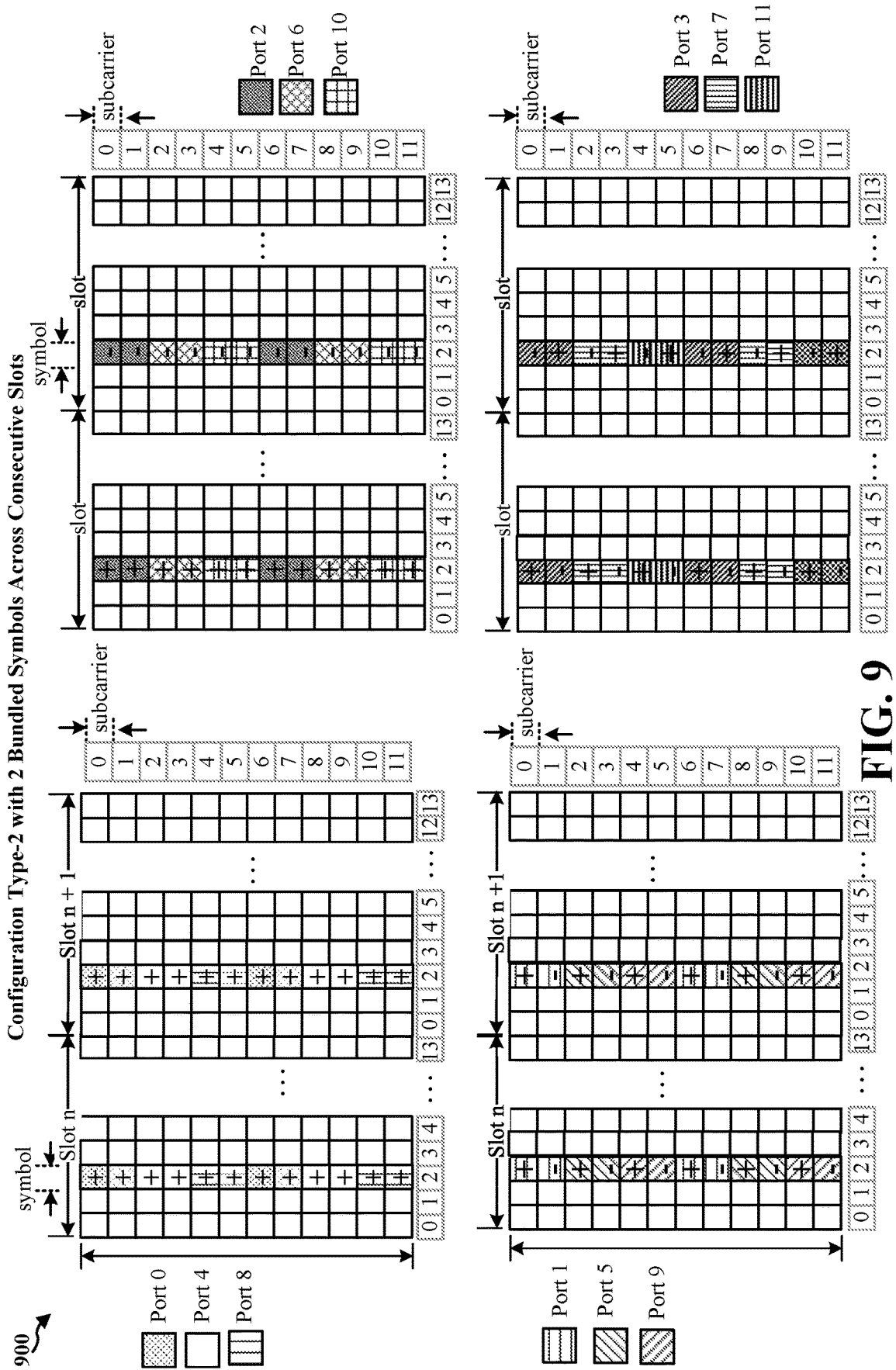
FIG. 9 is a diagram illustrating an example of a DMRS configuration type-2 that includes DMRS bundling across consecutive slots in accordance with some aspects of the present disclosure.

DMRS bundling across multiple slots may also be applied using a configuration type-2 DMRS pattern. FIG. 9 illustrates an example DMRS configuration type-2 900 that includes bundling across consecutive slots in accordance with some aspects of the present disclosure. In FIG. 9, the DMRS is bundled across two consecutive slots. By bundling the DMRS for configuration type-2 DMRS pattern, up to twelve orthogonal DMRS ports may be supported using a single symbol per slot to transmit the DMRS.

Figure 10:
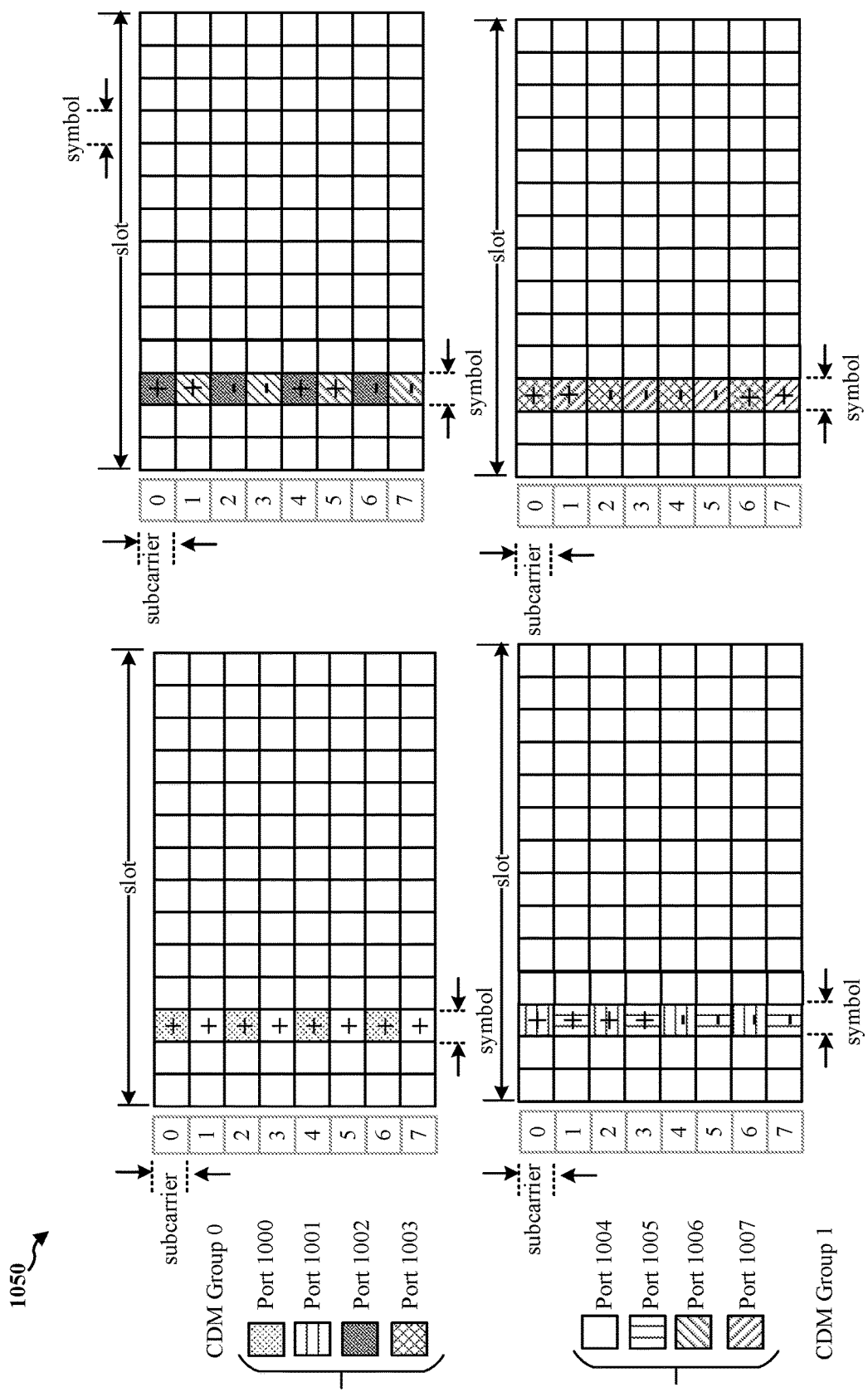
FIG. 10 is a diagram illustrating an example of a DMRS configuration type-1 that includes a single symbol for a physical resource block group (PRG) of 4 resource blocks in accordance with some aspects of the present disclosure.

FIG. 10 is a diagram illustrating an example of a DMRS configuration type-1 1050 using a single symbol for a PRG of four resource blocks in accordance with some aspects of the present disclosure. Data may be transmitted in the remaining symbols of the slot. In FIG. 10, the single symbol of DMRS is transmitted using only a single slot and supports up to eight orthogonal DMRS ports through the use of four FD-OCC and using the two comb frequency offset pattern described in connection with FIGS. 4 and 5. Table 1 illustrates an example of four FD-OCC for four code division multiplexing (CDM) patterns. As illustrated in FIG. 10, Port 1000 and Port 1004 use a pattern of "+1 +1 +1 +1" in the frequency domain. Ports 1001 and 1005 use a pattern of "+1 +1 −1 −1" in the frequency domain. Ports 1002 and 1006 use a pattern of "+1 −1 +1 −1" in the frequency domain. Ports 1003 and 1007 use a pattern of "+1 −1 −1 +1" in the frequency domain. Accordingly, ports 1000, 1001, 1002, and 1003 may form a first CDM group (CDM group 0) and ports 1004. 1005, 1006, and 1007 may form a second CDM group (CDM group 1). Through the use of the four FD-OCC along with the two comb pattern, eight different DMRS ports may be supported using a single symbol of a single slot. In order to improve the processing gain for the DMRS using the configuration illustrated in FIG. 10, the DMRS may be applied for a PRG of two or more RBs. For example, the DMRS may be applied for a PRG of four RBs. The use of a PRG of two or more RBs may help to ensure the quality of the channel estimation that can be performed by the UE by increasing the number of resource elements using the four FD-OCC for a corresponding DMRS port.

TABLE 1

| CDM Pattern | [$w_f(0)$ $w_f(1)$ $w_f(2)$ $w_f(3)$] |
| --- | --- |
| 0 | [+1 +1 +1 +1] |
| 1 | [+1 +1 −1 −1] |
| 2 | [+1 −1 +1 −1] |
| 3 | [+1 −1 −1 +1] |

Figure 11:
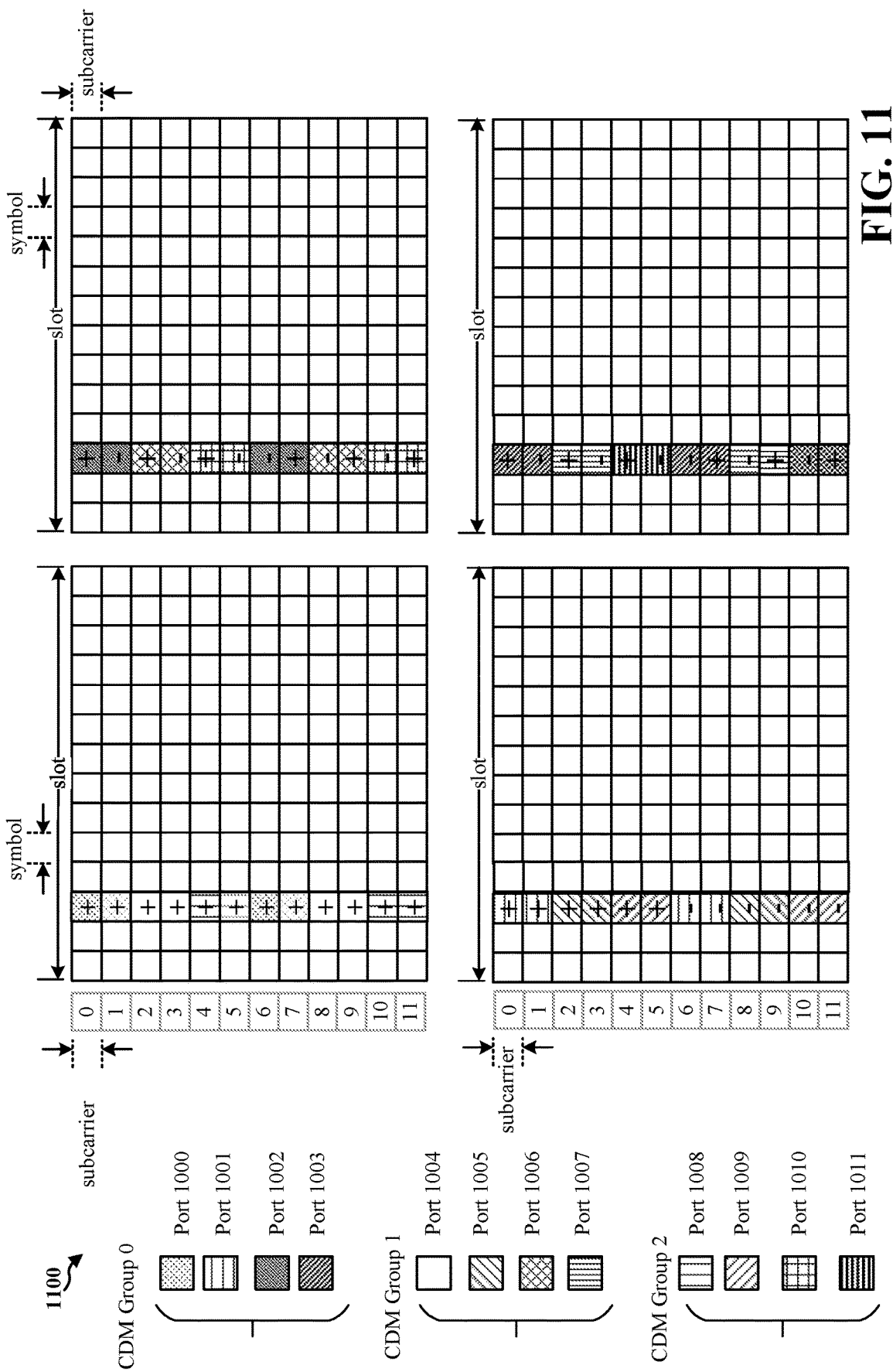
FIG. 11 is a diagram illustrating aspects of a single symbol DMRS configuration type-2 for a PRG of 4 resource blocks in accordance with some aspects of the present disclosure.

FIG. 11 is a diagram illustrating aspects of a single symbol DMRS configuration type-2 for a PRG of four resource blocks in accordance with some aspects of the present disclosure. While FIG. 10 illustrates a single symbol DMRS configuration 1050 using four FD-OCC for the alternating resource element pattern of configuration type-1 DMRS pattern, FIG. 11 illustrates a single symbol DMRS configuration 1100 using four FD-OCC for the three offset pattern of configuration type-2. As the configuration type-2 DMRS pattern includes a pattern involving three DMRS ports, the number of resource elements for the four FD-OCC increases from the 8 resource elements of FIG. 10 to 12 resource elements in FIG. 11. The DMRS ports may be grouped into three CDM groups, as illustrated. As with the DMRS configuration in FIG. 10, the configuration type-2 DMRS configuration of FIG. 11 using a single symbol of a single slot and a four FD-OCC may be used for a PRG of at least two RBs, for example a PRG of four RBs. The PRG size of two or more RBs may provide an improved processing gain for a UE decoding the DMRS. Data may be transmitted in the remaining symbols of the slot.

Figure 12:
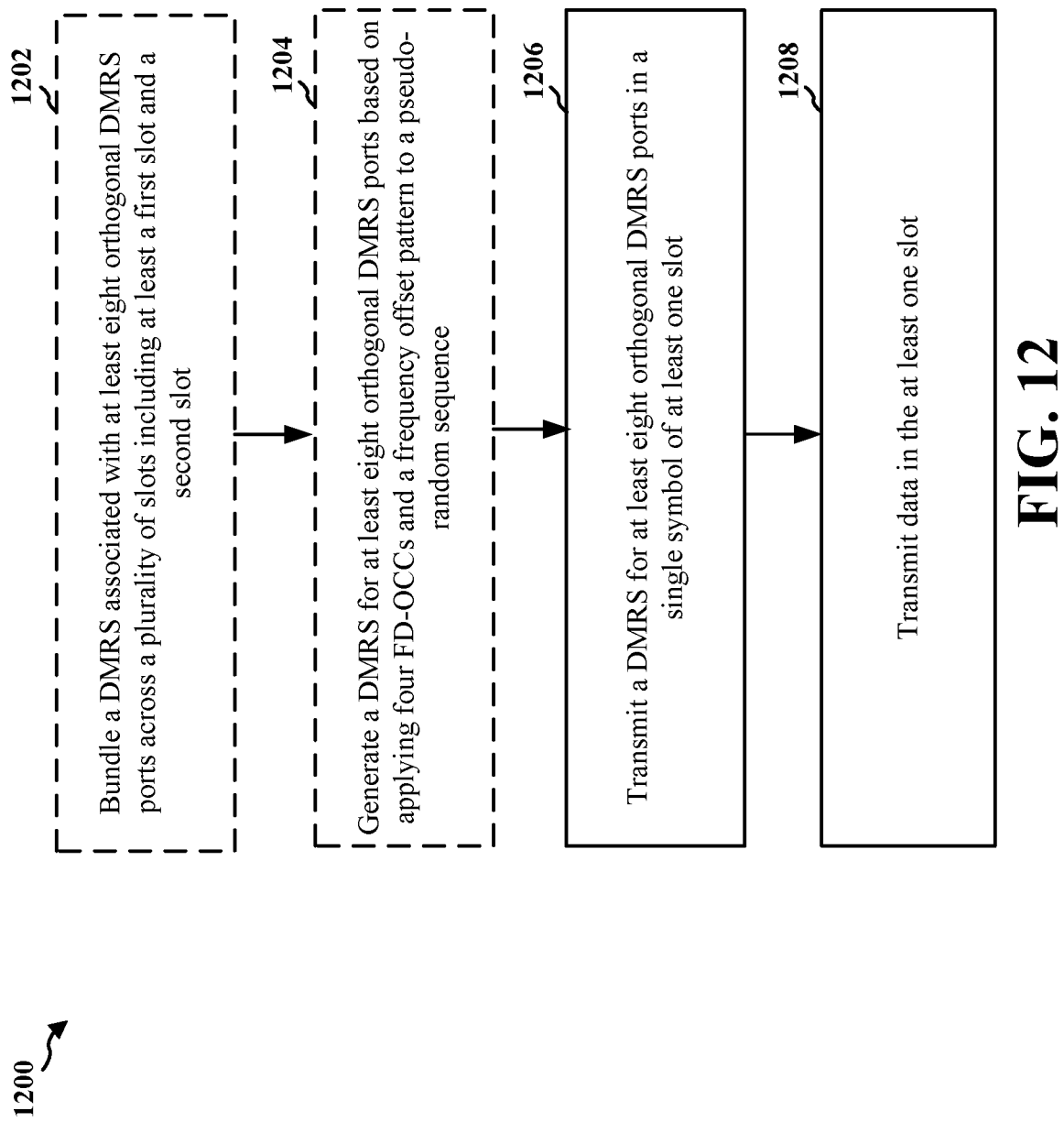
FIG. 12 is a flowchart illustrating a method of wireless communication that supports transmission of DMRS in a single symbol of a slot in accordance with some aspects of the present disclosure.

FIG. 12 is a flowchart illustrating a process 1200 of wireless communication that supports transmission of DMRS in a single symbol of a slot in accordance with some aspects of the present disclosure. In some aspects, the method may be performed by a base station that transmits downlink DMRS (such as the base station 102, 180, 310; the apparatus 1302; the processing system 1414, which may include the memory 376 and which may be the entire base station 310 or a component of the base station 310, such as the TX processor 316, the RX processor 370, or the controller/processor 375). In some aspects, the method may be performed by a UE transmitting uplink DMRS (such as the UE 104, 350; the apparatus 1302; the processing system 1414, which may include the memory 360 and which may be the entire UE 350 or a component of the UE 350, such as the TX processor 368, the RX processor 356, or the controller/processor 359). Although the flowchart will be described with the example of a base station performing the method, the method may be performed by a UE rather than a base station. The method helps to reduce the DMRS overhead by reducing DMRS to a single symbol per slot while enabling DMRS for up to twelve orthogonal DMRS ports.

At 1202, the apparatus optionally bundles a DMRS associated with at least eight orthogonal DMRS ports across a plurality of slots including at least a first slot and a second slot, for example as illustrated in FIGS. 8 and 9. The DMRS may be bundled by the bundling component 1312 of the apparatus 1302 in FIG. 13, for example as illustrated in FIGS. 8 and 9.

At 1204, the apparatus optionally generates a DMRS for at least eight orthogonal DMRS ports based on applying four frequency domain orthogonal cover codes (FD-OCCs) and a frequency offset pattern to a pseudo-random sequence, for example as illustrated in FIGS. 10 and 11. The DMRS for the eight orthogonal DMRS ports may be generated by the spreading component 1314 of the apparatus 1302 in FIG. 13.

At 1206, the base station transmits a DMRS for at least eight orthogonal DMRS ports in a single symbol of at least one slot. The transmission may be performed, for example, by the DMRS component 1306 of the apparatus 1302 in FIG. 13.

Transmitting the DMRS in the at least one slot may include bundling the DMRS across multiple slots, such as described in connection with the examples in FIGS. 8 and 9. Therefore, the base station may transmit the bundled DMRS in the multiple slots. The DMRS may be bundled across two adjacent slots, each slot including a single symbol DMRS. The DMRS may be transmitted in the two adjacent slots using a configuration type-1 DMRS pattern, such as illustrated in FIG. 8. The DMRS may be transmitted for up to eight orthogonal DMRS ports. The DMRS may be transmitted in the two adjacent slots using a configuration type-2 DMRS pattern, such as illustrated in FIG. 9. The DMRS may be transmitted for up to twelve orthogonal DMRS ports.

Transmitting the DMRS in the at least one slot may include transmitting the DMRS in only a single slot in each of at least two resource blocks in a PRG, such as described in connection with FIGS. 10 and 11. For instance, the DMRS may be transmitted in a single slot when 1202 is executed. The PRG may include four resource blocks and the DMRS may be transmitted in each of the four resource blocks. The DMRS may be transmitted using a configuration type-1 DMRS pattern or two comb frequency offset pattern, such as described in connection with FIG. 10. The DMRS may be transmitted using up to eight orthogonal DMRS ports. The DMRS may be transmitted using a configuration type-2 DMRS pattern or three offset frequency offset pattern, such as described in connection with FIG. 11. The DMRS may be transmitted using up to twelve orthogonal DMRS ports.

At 1208, the base station transmits data in the at least one slot. For example, in the case of bundling, the data may be transmitted in other symbols of the plurality of additional symbols of the first slot and the plurality of additional symbols of the second slot. The data may be transmitted, for example, by the data component 1308 or the transmission component 1310 of the apparatus 1302 in FIG. 13.

Figure 13:
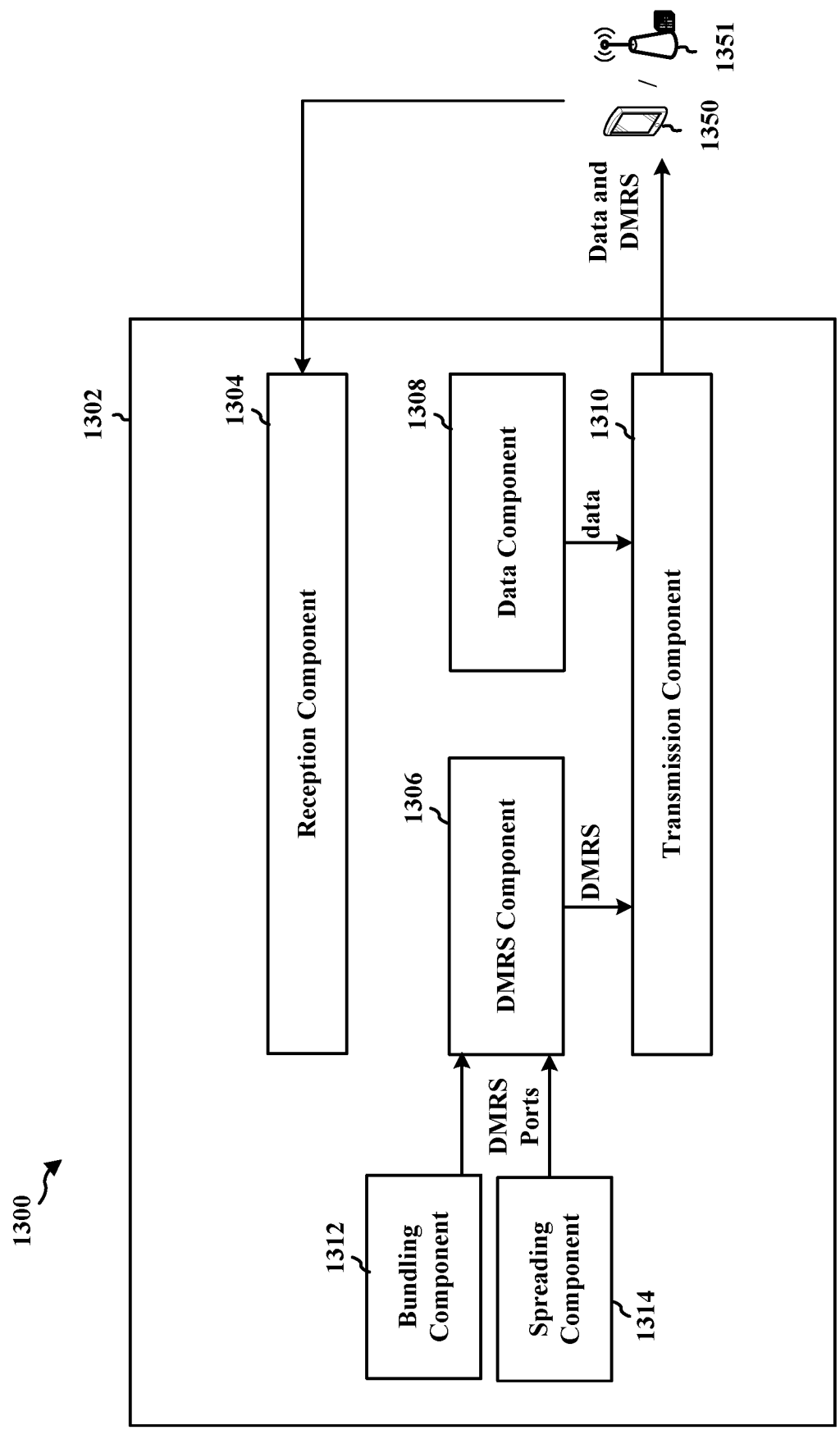
FIG. 13 is a conceptual data flow diagram illustrating the data flow between different components in an example apparatus in accordance with some aspects of the present disclosure.

FIG. 13 is a conceptual data flow diagram 1300 illustrating the data flow between different means/components in an example apparatus 1302 in accordance with some aspects of the present disclosure. In some aspects, the apparatus 1302 may be a base station that transmits downlink DMRS to a UE 1350. In some aspects, the apparatus 1302 may be a UE that transmits uplink DMRS to a base station 1351. The apparatus 1302 includes a reception component 1304 that receives wireless communication and a transmission component 1310 that transmits wireless communication.

The apparatus 1302 includes a bundling component 1312 that bundles a DMRS associated with at least eight orthogonal DMRS ports across a plurality of slots including at least a first slot and a second slot, such as described in connection with 1202 in FIG. 12. The first slot may have a single symbol for a first set of the DMRS ports and a plurality of additional symbols for data, and the second slot may have a single symbol for a second set of the DMRS ports and a plurality of additional symbols for data.

The apparatus 1302 includes a spreading component 1312 that generates a DMRS for at least eight orthogonal DMRS ports based on applying four FD-OCCs and a frequency offset pattern to a pseudo-random sequence, such as described in connection with 1204 in FIG. 12.

The apparatus 1302 includes a DMRS component that is configured to transmit a DMRS for at least eight orthogonal DMRS ports in a single symbol of at least one slot, such as described in connection with 1206 in FIG. 12. The DMRS may be bundled across multiple slots, as described in connection with FIGS. 8 and 9. The DMRS may be transmitted in a single symbol of only a single slot for a PRG including two or more resource blocks, such as described in connection with FIGS. 10 and 11. The apparatus 1302 includes a data component 1308 that is configured to transmit data in the at least one slot, such as described in connection with 1208 in FIG. 12.

The apparatus 1302 may include additional components that perform each of the blocks of the algorithm in the aforementioned flowchart of FIG. 12. As such, each block in the aforementioned flowchart of FIG. 12 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
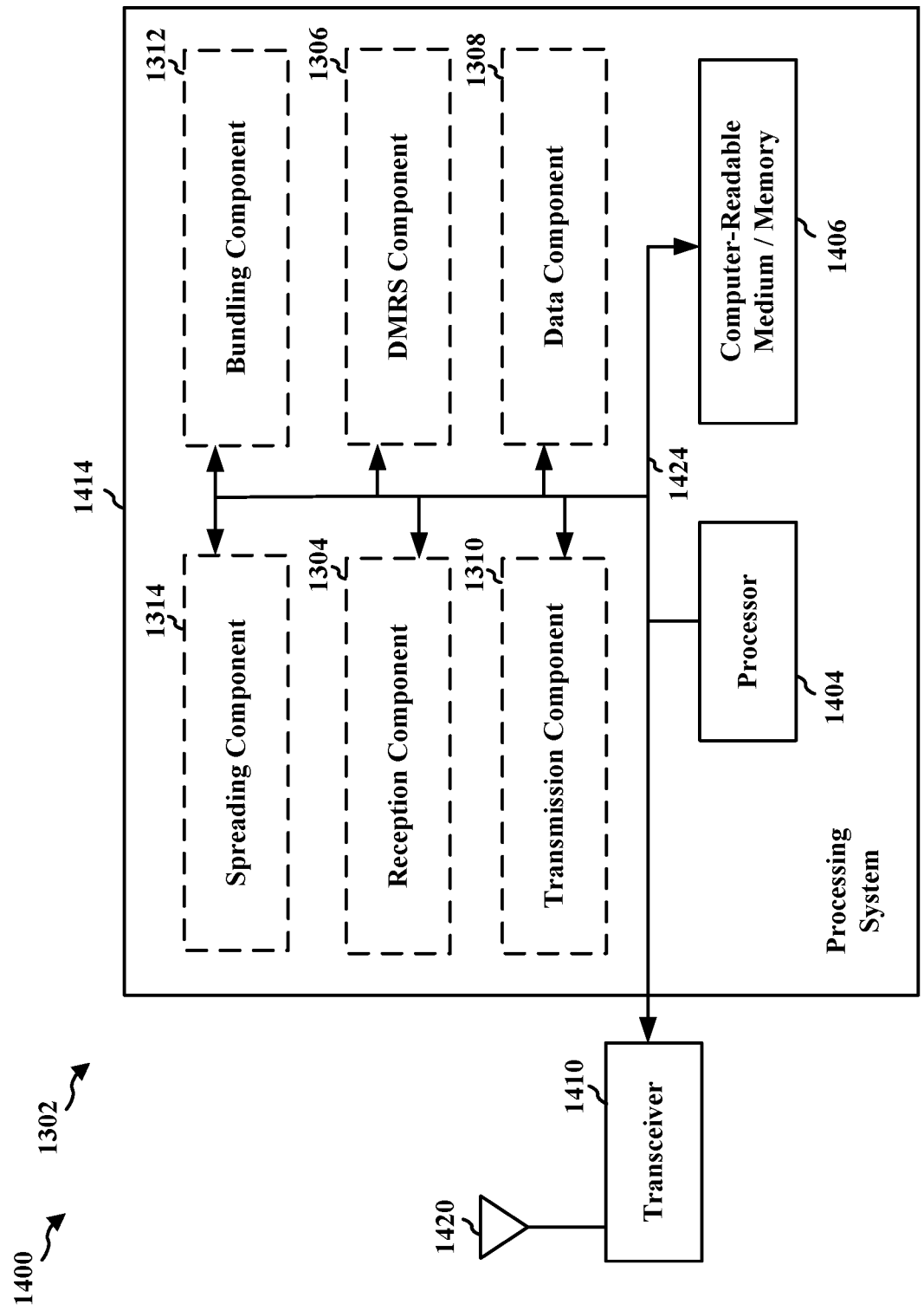
FIG. 14 is a diagram illustrating an example of a hardware implementation for an apparatus employing a processing system in accordance with some aspects of the present disclosure.

FIG. 14 is a diagram 1400 illustrating an example of a hardware implementation for an apparatus 1302 employing a processing system 1414 in accordance with some aspects of the present disclosure. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors or hardware components, represented by the processor 1404, the components 1304, 1306, 1308, 1310, 1312 and the computer-readable medium/memory 1406. The bus 1424 may also link various other circuits such as timing sources, peripherals, voltage regulators, and power management circuits.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described herein for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. In some aspects, the processing system 1414 may be a component of the base station 310 and may include the memory 376 or at least one of the TX processor 316, the RX processor 370, and the controller/processor 375. Alternatively, the processing system 1414 may be the entire base station (such as see 310 of FIG. 3). In some aspects, the processing system 1414 may be a component of the UE 350 and may include the memory 360 or at least one of the TX processor 368, the RX processor 356, and the controller/processor 359. Alternatively, the processing system 1414 may be the entire UE (such as see 350 of FIG. 3).

In one configuration, the apparatus 1302 for wireless communication includes means for transmitting a DMRS for at least eight orthogonal DMRS ports in a single symbol of at least one slot and means for transmitting data in the at least one slot. The apparatus may include means for bundling the DMRS associated with at least eight orthogonal DMRS ports across a plurality of slots including at least a first slot and a second slot. The apparatus may include means for generating a DMRS for at least eight orthogonal DMRS ports based on applying four FD-OCCs and a frequency offset pattern to a pseudo-random sequence. The aforementioned means may be one or more of the aforementioned components of the apparatus 1302 or the processing system 1414 of the apparatus 1302 configured to perform the functions recited by the aforementioned means. In some examples in which the apparatus is a base station or a component of a base station, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In some aspects in which the apparatus is a UE or a component of a UE, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a transmitting device, comprising:
bundling a demodulation reference signal (DMRS) associated with at least eight orthogonal DMRS ports across a plurality of slots including at least a first slot and a second slot, the first slot having a single symbol for a first set of the DMRS ports and a plurality of additional symbols for data, the second slot having a single symbol for a second set of the DMRS ports and a plurality of additional symbols for data;
transmitting the bundled DMRS in the single symbol of the first slot for the first set of DMRS ports and in the single symbol of the second slot for the second set of DMRS ports; and transmitting data in other symbols of the plurality of additional symbols of the first slot and the plurality of additional symbols of the second slot.

2. The method of claim 1, wherein the at least eight orthogonal DMRS ports correspond to eight layers for a transmission for a user equipment.

3. The method of claim 2, wherein the DMRS is bundled across two adjacent slots, each of the first slot and the second slot including a single symbol DMRS.

4. The method of claim 3, wherein the DMRS is transmitted in the two adjacent slots using a two comb frequency offset pattern and two frequency-domain orthogonal cover codes (FD-OCC).

5. The method of claim 4, wherein the DMRS is transmitted for eight orthogonal DMRS ports.

6. The method of claim 3, wherein the DMRS is transmitted in the two adjacent slots using a three offset frequency offset pattern and two FD-OCC.

7. The method of claim 6, wherein the DMRS is transmitted for twelve orthogonal DMRS ports.

8. A method of wireless communication by a transmitting device, comprising:
generating a demodulation reference signal (DMRS) for at least eight orthogonal DMRS ports based on applying four frequency domain orthogonal cover codes (FD-OCCs) and a frequency offset pattern to a pseudo-random sequence;
transmitting the DMRS in a single symbol in a single slot in each of at least two resource blocks in a physical resource block group (PRG); and
transmitting data in other symbols of the single slot.

9. The method of claim 8, wherein the at least eight orthogonal DMRS ports correspond to eight layers for a transmission for a user equipment.

10. The method of claim 8, wherein the PRG comprises four resource blocks and wherein the DMRS is transmitted in each of the four resource blocks.

11. The method of claim 8, wherein a DMRS port corresponding to each of the four FD-OCCs is transmitted on a same set of frequency domain resources.

12. The method of claim 8, wherein the DMRS is transmitted using two comb frequency offset pattern.

13. The method of claim 12, wherein the DMRS is transmitted using eight orthogonal DMRS ports.

14. The method of claim 8, wherein the DMRS is transmitted using a three offset frequency offset pattern.

15. The method of claim 14, wherein the DMRS is transmitted using twelve orthogonal DMRS ports.

16. An apparatus of a transmitting device for wireless communication, comprising:
a memory; and
at least one processor coupled to the memory and configured to:
bundle a demodulation reference signal (DMRS) associated with at least eight orthogonal DMRS ports across a plurality of slots including at least a first slot and a second slot, the first slot having a single symbol for a first set of the DMRS ports and a plurality of additional symbols for data, the second slot having a single symbol for a second set of the DMRS ports and a plurality of additional symbols for data;
transmit the bundled DMRS in the single symbol of the first slot for the first set of DMRS ports and in the single symbol of the second slot for the second set of DMRS ports; and
transmit data in other symbols of the plurality of additional symbols of the first slot and the plurality of additional symbols of the second slot.

17. The apparatus of claim 16, wherein the at least eight orthogonal DMRS ports correspond to eight layers for a transmission for a user equipment.

18. The apparatus of claim 17, wherein the DMRS is bundled across two adjacent slots, each of the first slot and the second slot including a single symbol DMRS.

19. The apparatus of claim 18, wherein the DMRS is transmitted in the two adjacent slots using a two comb frequency offset pattern and two frequency-domain orthogonal cover codes (FD-OCC).

20. The apparatus of claim 19, wherein the DMRS is transmitted for eight orthogonal DMRS ports.

21. The apparatus of claim 18, wherein the DMRS is transmitted in the two adjacent slots using a three offset frequency offset pattern and two FD-OCC.

22. The apparatus of claim 21, wherein the DMRS is transmitted for twelve orthogonal DMRS ports.

23. An apparatus of a transmitting device for wireless communication, comprising:
a memory; and
at least one processor coupled to the memory and configured to:
generate a demodulation reference signal (DMRS) for at least eight orthogonal DMRS ports based on applying four frequency domain orthogonal cover codes (FD-OCCs) and a frequency offset pattern to a pseudo-random sequence;
transmit the DMRS in a single symbol in a single slot in each of at least two resource blocks in a physical resource block group (PRG); and
transmit data in other symbols of the single slot.

24. The apparatus of claim 23, wherein the at least eight orthogonal DMRS ports correspond to eight layers for a transmission for a user equipment.

25. The apparatus of claim 23, wherein the PRG comprises four resource blocks and wherein the DMRS is transmitted in each of the four resource blocks.

26. The apparatus of claim 23, wherein a DMRS port corresponding to each of the four FD-OCCs is transmitted on a same set of frequency domain resources.

27. The apparatus of claim 23, wherein the DMRS is transmitted using a two comb frequency offset pattern.

28. The apparatus of claim 27, wherein the DMRS is transmitted using eight orthogonal DMRS ports.

29. The apparatus of claim 23, wherein the DMRS is transmitted using a three offset frequency offset pattern.

30. The apparatus of claim 29, wherein the DMRS is transmitted using twelve orthogonal DMRS ports.

* * * * *